(12) United States Patent
Oppermann

(10) Patent No.: US 9,507,107 B2
(45) Date of Patent: Nov. 29, 2016

(54) ARRANGEMENT OF A SUBSTRATE WITH AT LEAST ONE OPTICAL WAVEGUIDE AND WITH AN OPTICAL COUPLING LOCATION AND OF AN OPTOELECTRONIC COMPONENT, AND METHOD FOR MANUFACTURING SUCH AN ARRANGEMENT

(71) Applicant: Fraunhofer-Gesellschaft zur Förderung der angewandten Forschung e.V., München (DE)

(72) Inventor: Hans-Hermann Oppermann, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 73 days.

(21) Appl. No.: 14/323,002

(22) Filed: Jul. 3, 2014

(65) Prior Publication Data
US 2015/0010270 A1    Jan. 8, 2015

(30) Foreign Application Priority Data
Jul. 4, 2013  (DE) .......................... 10 2013 011 581

(51) Int. Cl.
| | |
|---|---|
| *G02B 6/42* | (2006.01) |
| *G02B 6/12* | (2006.01) |
| *G02B 6/34* | (2006.01) |

(52) U.S. Cl.
CPC ............... *G02B 6/4245* (2013.01); *G02B 6/12* (2013.01); *G02B 6/34* (2013.01); *G02B 6/42* (2013.01); *G02B 6/4214* (2013.01); *G02B 6/4236* (2013.01); *G02B 6/4244* (2013.01); *G02B 6/4295* (2013.01); *G02B 6/4296* (2013.01); *G02B 6/4232* (2013.01); *G02B 6/4238* (2013.01); *G02B 2006/12083* (2013.01);

(Continued)

(58) Field of Classification Search
CPC .................................................. G02B 6/4214
See application file for complete search history.

(56) References Cited

U.S. PATENT DOCUMENTS

| | | | |
|---|---|---|---|
| 5,017,263 A | 5/1991 | Clark | |
| 5,073,003 A * | 12/1991 | Clark | G02B 6/4214 372/36 |
| 6,049,638 A | 4/2000 | Norimatsu et al. | |

(Continued)

FOREIGN PATENT DOCUMENTS

DE           3315861        5/1984

*Primary Examiner* — Michelle R Connelly
(74) *Attorney, Agent, or Firm* — Schwegman Lundberg & Woessner, P.A.

(57) ABSTRACT

An arrangement of a substrate with at least one optical waveguide and with an optical coupling location for coupling in and/or coupling out an optical a radiation into and/or out of the at least one optical waveguide, and of at least one optoelectronic component which is assembled on the substrate and a method for manufacturing such an arrangement is suggested. The optical coupling location is designed in a manner such that the radiation is coupled in and/or coupled out with a coupling-in and/or coupling-out angle of greater than 2° to the perpendicular to the substrate surface. The optoelectronic component is assembled over the coupling location on the substrate in a manner tilted obliquely to the substrate surface, wherein the tilt angle to this surface corresponds to the coupling-in angle and/or coupling out-angle.

15 Claims, 3 Drawing Sheets

(52) U.S. Cl.
CPC ............... *G02B2006/12107* (2013.01); *G02B 2006/12176* (2013.01)

(56) References Cited

U.S. PATENT DOCUMENTS

| | | | |
|---|---|---|---|
| 6,161,965 A | 12/2000 | Honmou | |
| 6,850,674 B2 * | 2/2005 | Haraguchi | G02B 6/3636 385/129 |
| 7,024,079 B2 * | 4/2006 | Komiya | G02B 6/42 385/129 |
| 9,031,365 B2 * | 5/2015 | Park | H04B 10/27 385/36 |
| 9,188,743 B2 * | 11/2015 | Choraku | G02B 6/26 |
| 2005/0117831 A1 | 6/2005 | Komiya et al. | |
| 2013/0330035 A1 * | 12/2013 | Shin | G02B 6/12 385/14 |
| 2015/0316718 A1 * | 11/2015 | Fattal | G02B 6/29323 385/14 |

* cited by examiner

ARRANGEMENT OF A SUBSTRATE WITH AT LEAST ONE OPTICAL WAVEGUIDE AND WITH AN OPTICAL COUPLING LOCATION AND OF AN OPTOELECTRONIC COMPONENT, AND METHOD FOR MANUFACTURING SUCH AN ARRANGEMENT

CLAIM OF PRIORITY

This application claims the benefit of priority of German Patent Application Serial No. 10 2013 011 581.7, entitled "Anordnung aus einem Substrat mit mindestens einem optischen Wellenleiter und einer optischen Koppelstelle und aus einem optoelektronischen Bauelement und Verfahren zur Herstellung einer solchen Anordnung," filed on Jul. 4, 2013, the benefit of priority of which is claimed hereby, and which is incorporated by reference herein in its entirety.

TECHNICAL FIELD

The invention relates to an arrangement of a substrate with at least one optical waveguide and with an optical coupling location for coupling-in and/or coupling-out an optical beam into and/or out of the at least one optical waveguide, and of at least one optoelectronic component which is assembled on the substrate, according to the preamble of the main claim, and to a method for manufacturing such an arrangement.

BACKGROUND

A precise coupling-in or coupling-out the light or the radiation into the waveguide is necessary for the optical connection of an optoelectronic semiconductor component to a waveguide on a substrate carrier. Optical coupling systems which transmit the radiation from one component onto another one are used for this, wherein such optical coupling systems are applied for example in the field of optoelectronics, in particular in optical communication, in computing and in optical sensor systems. In particular, optical and optoelectronic components such as for example photo-detectors, semiconductor lasers, in particular surface emitters (VCSEL vertical cavity surface emitter laser) as well as semiconductor-based integrated optoelectronic circuits are considered as semiconductor components. The mentioned radiation, which is also indicated as light, light beams, a light signal or a light impulse, is typically monochromatic or usually has wavelengths within a narrow wavelength range.

Typically, light beams, at least in sections are led in light waveguides, wherein the light waveguides are often arranged on surfaces of two-dimensional substrates or carriers. With such "planarly integrated" light waveguides, there is often the problem of transmitting the light beams from the light waveguide perpendicularly or at a predefined angle to the surface of the substrate or carrier, onto another component, specifically onto an optoelectronic component, or of coupling a light beam coming from the component in the reverse direction perpendicularly or at a predefined angle to the surface of the substrate or carrier, into the light waveguide.

For this purpose, the radiation is often deflected at a mirror surface which is integrated in the carrier, wherein the mirror surface is to be aligned at a 45° angle to the surface of the substrate, in order to permit a perpendicular coupling-out or coupling-in of the light beam. For this, it is for example known to grind the substrate from the lower side at a 45° angle or to machine it with a laser. It is also known to emboss a 45° plane into a polymer substrate and to subsequently metallise this plane. Other mirrors which are produced in a standard silicon wafer by way of micromechanical technologies, for example have angles between 40° and 60° to the substrate surface, which leads to a beam deflection, by way of which the exiting radiation deviates from the perpendicular.

Moreover, so-called grating couplers are known, with which the coupling structures are Bragg gratings which are etched into waveguides, e.g. of silicon. The coupling efficiency is thereby dependent on the angle and optical coupling angles which differ from the perpendicular are defined for an optimal coupling-in or coupling-out of the light into or out of the optical waveguides.

SUMMARY

It is the object of the invention, to provide an arrangement of a substrate with at least one optical waveguide and with an optical coupling location for coupling in and/or coupling out an optical radiation into the and/or out of the at least one optical waveguide, and of at least one optoelectronic component which is assembled onto the substrate, said arrangement, with a coupling-in direction into the waveguide and/or a coupling-out direction out of the waveguide, with more than 2° deviation from the perpendicular to the substrate surface, permitting the radiation entering into the optoelectronic component or the radiation exiting from the optoelectronic component to be a aligned perpendicularly to the surface of the optoelectronic component. Moreover, it is the object of the invention to keep the distance between the optoelectronic component and the optical waveguide as low as possible, in order to avoid a beam widening. Moreover, it is the object of the invention to provide a method for manufacturing such an arrangement, with which the manufacture is relatively simple to realise.

According to the invention, this object is achieved by the features of the independent device claim and of the independent method claim.

Advantageous further developments and improvements are possible by way of the features specified in the dependent claims.

The arrangement according to the invention comprises a substrate or a substrate carrier with at least one optical waveguide and with an optical coupling location for coupling in and or coupling out an optical radiation into and/or out of the at least one optical waveguide, and at least one optoelectronic component which is assembled on the substrate. The optical coupling location is thereby designed in a manner such that the radiation or the light beams is or are coupled in and/or coupled out at a coupling-in and/or coupling-out angle of >2° to the perpendicular to the substrate surface. According to the invention, the optoelectronic component whose optical interface is arranged on its surface is assembled in a tilted manner over the coupling location on the substrate, obliquely to the substrate surface, wherein the tilt angle to the substrate surface corresponds to the coupling-in and/or coupling-out angle.

By way of the arrangement according to the invention, it is possible to permit light beams which exit from the coupling location at an angle of greater than 2° to the perpendicular to the substrate surface to enter into the optoelectronic component or its interface, without further optical elements being necessary, in order to accordingly align the light beams. The optoelectronic component can also be assembled as a small distance to the substrate surface by way of this.

The optical coupling location of the substrate can advantageously be designed as an etched mirror, preferably as a mirror micromechanically etched in silicon, wherein this mirror is preferably designed with an angle of about 54.7°.

In another preferred embodiment example, the optical coupling location is designed as a grating which is etched into the substrate, for example with an optimal coupling angle of 10° to the perpendicular.

The optoelectronic component is preferably designed as a photo-detector, a photonic integrated circuit or as a VCSEL, whose optical interface is usually arranged on the surface, by which means a perpendicular exit or entry of the light beams is recommended.

A particularly preferred embodiment example is given in that the optoelectronic component is connected to the substrate via connection elements, preferably electrical contact elements, by way of flip-chip assembly, wherein for setting the tilt angle, the connection elements have different heights at different sides with respect to the optoelectronic component. The tilt angle of the optoelectronic component with respect to the substrate surface can be set in a sufficiently accurate manner due to the fact that such different heights of the connection elements are provided, said connection elements being able to be designed as melting or non-melting bumps, so that the radiation or the light beams enter into the optoelectronic component or exit out of this in a perpendicular manner. This is a particularly simple way to set the demanded tilt angle.

According to the invention, a method for manufacturing an arrangement of a substrate which comprises at least one optical a waveguide and an optical coupling location for coupling in and/or coupling out an optical radiation into and/or out of the at least one optical a waveguide, and of at least one optoelectronic component is provided, wherein the optical coupling location is designed in a manner such that the radiation is coupled in and/or coupled out at a coupling-in and/or coupling-out angle >2° to the perpendicular to the substrate surface. The method comprises the steps of depositing several connection elements into the surface of the substrate and/or onto the optoelectronic component, arranging the optoelectronic component over the coupling location and connecting the component to the substrate by way of the connection elements, in a manner such that optoelectronic component is arranged obliquely tilted to the substrate surface after the connection, with a tilt angle to this surface which corresponds to the coupling-in and/or coupling-out angle. The connection elements can be provided on the optoelectronic component, on the substrate or on both components, depending on the type of connection elements.

In the preferred embodiment example, the optoelectronic component is connected to the substrate by way of the flip-chip method, wherein the connection elements are realised as connection bodies and land surfaces for the connection bodies. Thereby, the land surfaces can be deposited onto the substrate and/or onto the optoelectronic component. The connection elements with respect to the different sides of the optoelectronic component can be deposited onto the substrate and/or the optoelectronic component with different heights, in order to achieve the desired tilt angle after the connection of the optoelectronic component to the substrate.

Thereby, the different heights can be realised by the heights of the connection bodies and/or the heights of the land surfaces with respect to the different sides of the optoelectronic component. It is also conceivable for the heights of the connection bodies according to the different sides of the optoelectronic component to be achieved by way of applying onto one another in different numbers.

The connection bodies can thereby be deposited onto the land surface as melting bumps of solder material or also as stud bumps with a pronounced height, of wire material, preferably gold, platinum, or copper.

As is evident above, on assembly, the optoelectronic component is applied in an oblique manner and connected to the substrate, wherein different heights can result for the connection, e.g. for the bump connection. This can be produced such that both sides are provided with uniformly high bumps, which however are arranged such that in each case one or more bumps stand opposite on the optoelectronic component and the substrate, whereas only one bump is either arranged on the component or on the substrate. Bumps of different height can however also be provided. One example of producing different bump heights is mechanical stud bumping, with which a first contact with a gold ball is produced with a modified wire bonder, and the gold wire is then torn off. Thereby, it is possible vary the geometry of the gold contacts and specifically by way of the selection of the wire diameter, the gold alloy as well as its hardness as well as of the bond capillaries. The process parameters such as flaming-off parameters, pressing force, ultrasound power and bond time also have a large influence on the geometry of the balls. Bump heights between for example 20 and 80 μm can be produced by way of this. The same wire and the same process parameters can also be selected for different bump heights, wherein with respect to the one side a single stud ball and with respect to the other side e.g. a double stud can be applied. With the latter, a second one is simply placed onto the first stud. Thereby other materials, such as platinum or copper, such as e.g. Cu-pillar bumps with different heights or equally high solder bumps which are soldered onto differently high, wetting land surfaces or pads can also be applied, apart from the use of the mentioned gold studs.

Preferably, the land surfaces at least partly are envisaged as pure fastening surfaces, i.e. for a thermal connection or if the fastening surfaces only serve for increasing the strength. They can however also at least partly be designed as electrically conductive contact surfaces or pads, so that the electrically conductive connection between respective connection structures can be created simultaneously with the connection of the component to the substrate.

Different connection methods can be used, depending on the type of applied connection elements. For example, the optoelectronic component and the substrate can be realised via the connection elements by way of thermo-compression, ultrasound bonding, bonding and/or soldering.

In another preferred embodiment example of the method according to the invention, the connection bodies of solder material with respect to the different sides of the optoelectronic component can be deposited with different solder volumes on land surfaces of the same size or with the same solder volumes on land surfaces of a different size. On melting, then different heights of the melted connections bodies are set on account of the minimisation of the surface energy, so that the tilt angle between the optoelectronic component and the substrate is set.

In a further advantageous embodiment example, the connection bodies of solder material with respect to one side of the optoelectronic element are with a greater diameter deposited on the land surface than the connection bodies on the land surface with respect to the other side of the optoelectronic component, wherein the land surfaces are processed such that a part of the land surface with the solder material of a greater diameter de-wets on melting, whereas the land surface with the solder material of the smaller diameter does not act a non-dewetting manner, in a manner such that the melted connection bodies with the dewetting part surface result in a greater volume, and a greater height is formed, than the connection bodies with the smaller diameter.

As mentioned, the different contact heights of the bumps can be achieved by way of different solder volumes, since with flip-chip soldering the solder material assumes a previously predicable geometry due to the surface energy. For this reason, the solders with the same or different solder volumes can be created with the same or different diameters on the land surfaces in a simple manner. The height of the connection body can be computed from the base area of the solder bump, the oppositely-lying pad area (surface) and the solder volume, via the volume of a ball layer.

Finally, in a particularly preferred embodiment example, a tool with an oblique surface for receiving the optoelectronic component can be used, with which tool the optoelectronic component is applied onto the substrate with the connection elements and is fixed, preferably by way of thermo-compression. In this manner, the tilt angle of the optoelectronic component with regard to the substrate surface can be exactly set by the angle of the receiving surface of the tool, wherein here however the height of the connection elements or of the connection body also plays a part. The tilting of the tool and of the received chip as an optoelectronic component should be matched to the differently high bumps, so that the same forces act on the high and the lower bumps, e.g. studs and double studs when bonding, and thus a uniformly welded connection is achieved.

BRIEF DESCRIPTION OF THE DRAWINGS

Embodiment examples of the invention are represented in the drawing and are explained in more detail in the subsequent description. There are shown in.

DETAILED DESCRIPTION

Figure 1:
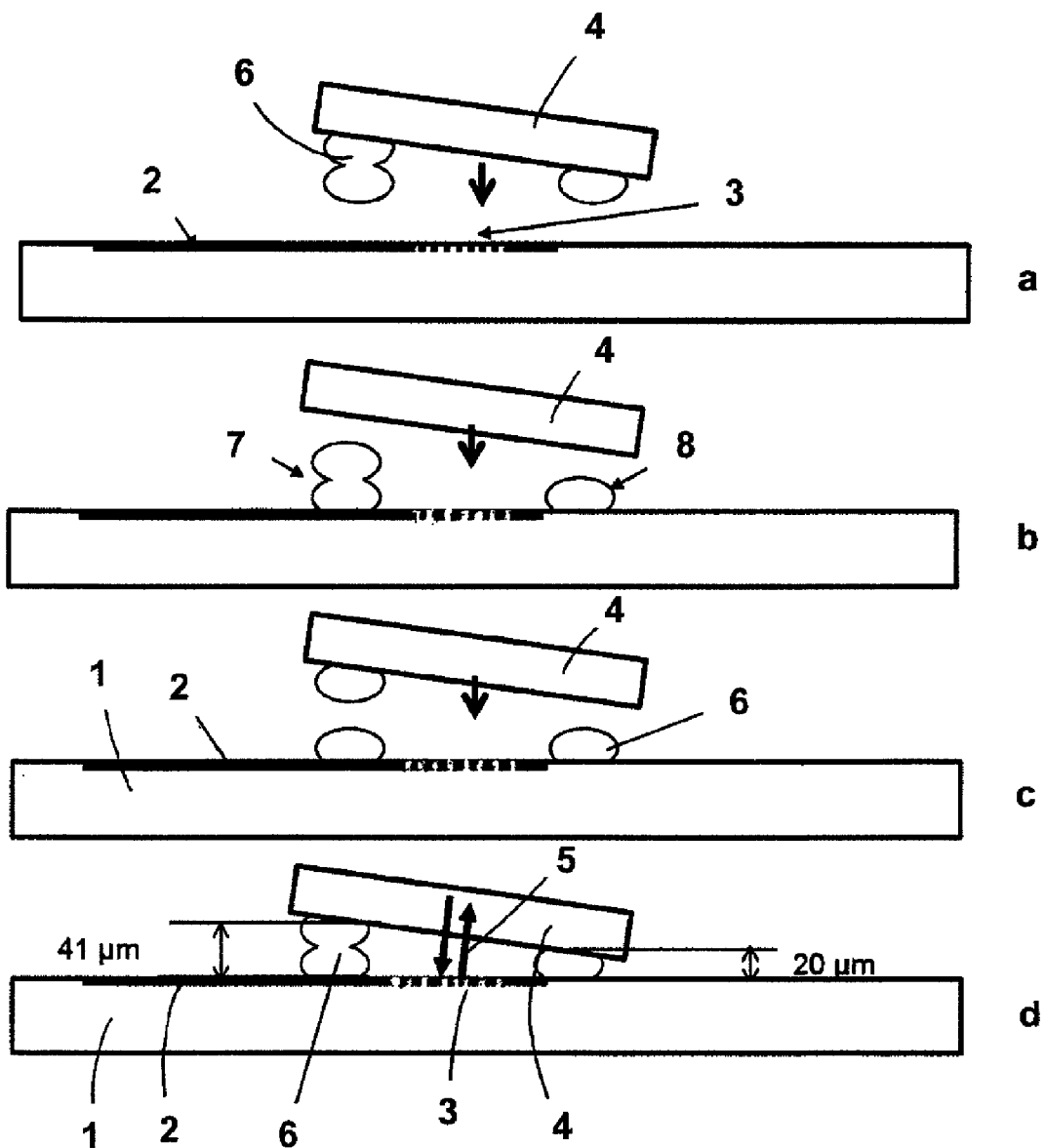
FIGS. 1a, 1b, 1c and 1d schematic representations of the arrangement according to the invention, in different embodiments and method steps.

An arrangement according to the invention and of a substrate 1 which for example is a silicon wafer and which comprises a schematically indicated optical waveguide 2 and an optical coupling location 3, and of an optoelectronic component 4 which is a photodiode or a surface emitter (VCSEL) for example, is represented in FIG. 1 in FIG. 1d. The coupling location 3 here is designed as a grating, e.g. a Bragg grating which is etched into the silicon waveguide 2. The coupling efficiency of the grating is angle-dependent, and with an oblique coupling of about 10° the lowest losses are measured for such a grating.

Another possibility of a coupling location which is not represented is a mirror which is etched in silicon, and the waveguide is subsequently structured. For example, a mirror produced in such a manner has an angle of approx. 54.7° to the substrate surface which leads to a beam deflection of approx. 109.5° and thus differs or deviates by approx. 19.5° from the perpendicular.

The optoelectronic component 4 has an optical interface which is usually aligned according to its surface. For this reason, in order for the light beams radiated from the coupling location 3 to enter perpendicularly, the optoelectronic component must be arranged at a tilt angle to the substrate surface which is usually assumed as being horizontal, according to the beam emission angle of the coupling location 3. In the case of a grating coupling location 3 which has a coupling-out angle which differs by 10° from the perpendicular, the tilt angle of the optoelectronic component 4 should be 10° to the horizontal. These specifications in an analogous manner apply to the coupling-in angle of the coupling location 3. The coupled-in and coupled-out light beams are indicated at 5.

The distance between the optoelectronic component 3 and the led waveguides 2 must be as small as possible, since the light beam after the exit widens in the free beam path and the coupling efficiency also reduces with a greater distance without collimating lenses. A direct flip-chip assembly over the mirror or the grating 3 is envisaged for this reason. As is to be recognised, the optoelectronic component is not assembled parallel to the substrate surface, but is assembled on the substrate surface in an obliquely tilted manner via connection elements, in order to correct the coupling-in angle or coupling-out angle. The connection elements 6 are thereby designed as connection bodies and land surfaces which hereinafter are also indicated as bumps and pads. The connection elements 6 are formed on opposite sides of the optoelectronic component in different heights, in order to achieve the tilt angle of the component 4. For example, the connection elements 6 in FIG. 1d on the left side have a height of 41 μm, whereas the height of the connection elements 6 on the right side of FIG. 1d is 20 μm. On assembly, the optoelectronic component 4 is applied obliquely, as is represented in the FIGS. 1a, 1b, 1c, and is connected to the substrate 1. Thus a tilting of 10° is set with a height difference of 21 μm. In FIG. 1, the different heights of the bump connection are achieved by way of the fact that two bumps are arranged over one another at the one side 7, whereas only one bump as a connection element 6 is envisaged on the other side 8. Thereby, the bumps can be fastened on the component 4 according to FIG. 1a or on the substrate 1 as in FIG. 1b. However, it is also possible, as shown in FIG. 1c, in the case of two bumps lying over one another, for the one bump to be fastened on the substrate and the other bump on the optoelectronic component. Of course, the connection elements 6 from the beginning can be provided in different heights and be fastened on the substrate and/or on the optoelectronic component 4.

The bumps as connection elements 6 can be deposited directly as so-called solder bumps on land surfaces or pads on the substrate 1 or the optoelectronic component 4, but other mechanical methods for manufacturing bumps are also conceivable, which are then indicated as studs or stud-bumps. The mechanical manufacture of the stud-bumps is based on a wire-bond process, with which the wire with a modified wire bonder is deposited with the ball-wedge method, wherein then the wire is torn away directly above the ball. As the case may be, the so-called bumps can yet be flattened off with a tool.

The stud-bumps, as specified, are manufactured of wire, wherein studs of pure gold or of a gold alloy are often used. However, other materials can be used, such as platinum, silver, palladium or copper.

Figure 2:
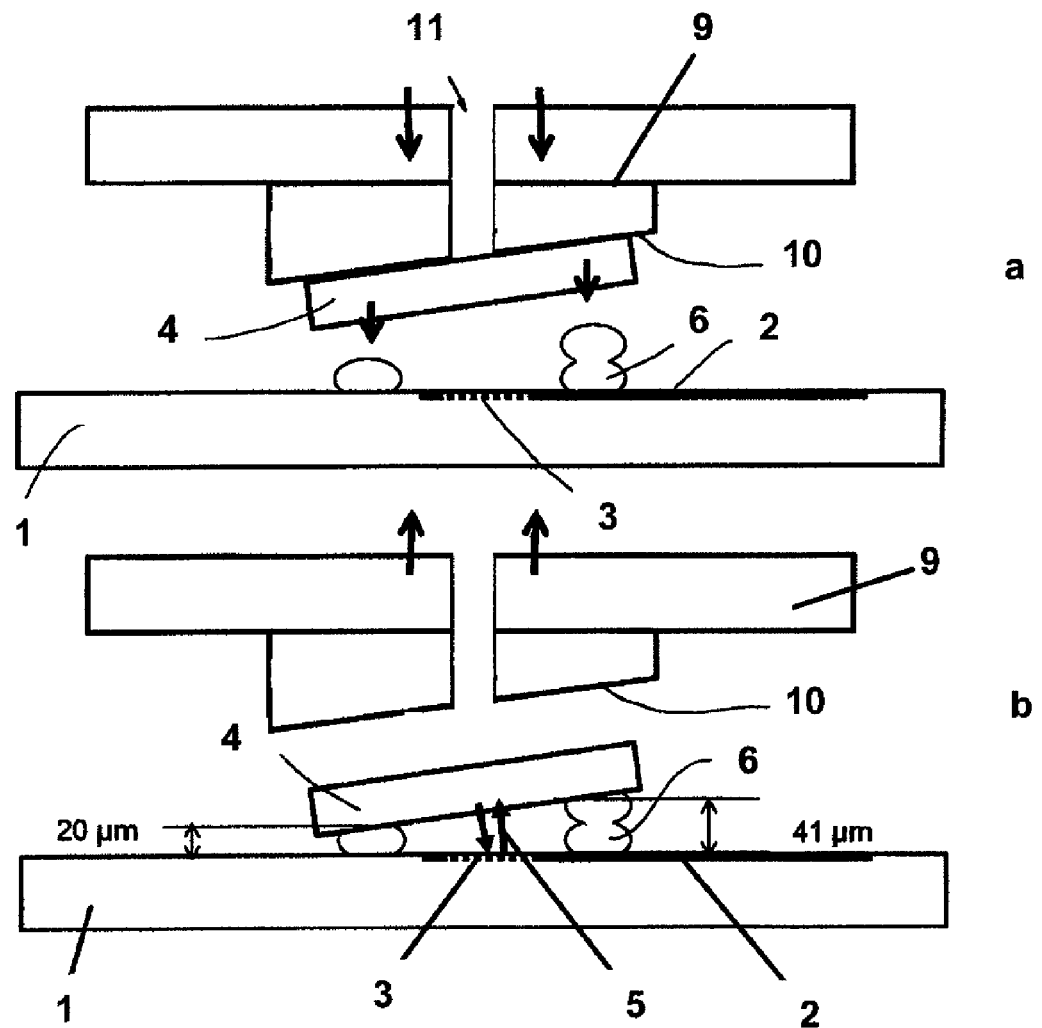
FIGS. 2a and 2b an arrangement according to the invention, in the assembly with a tool.
Figure 3:
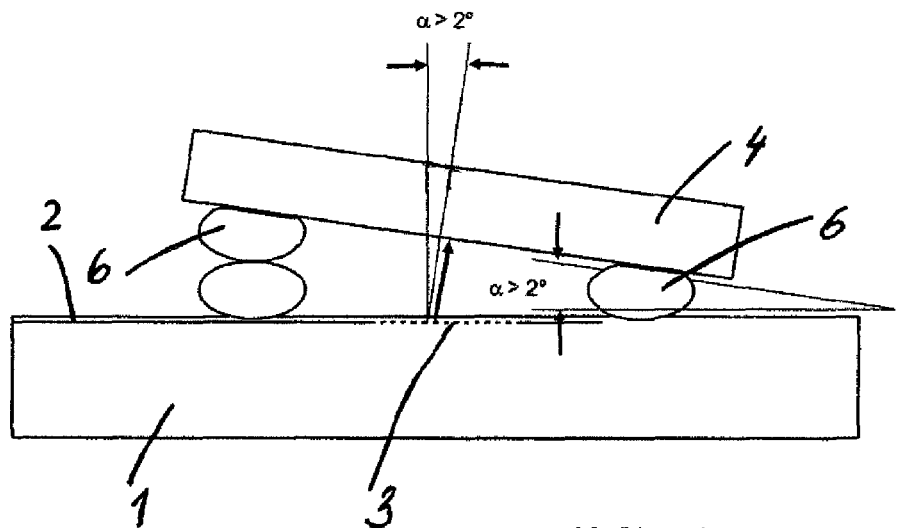
FIG. 3 an enlarged view of FIG. 1d.
Figure 4:
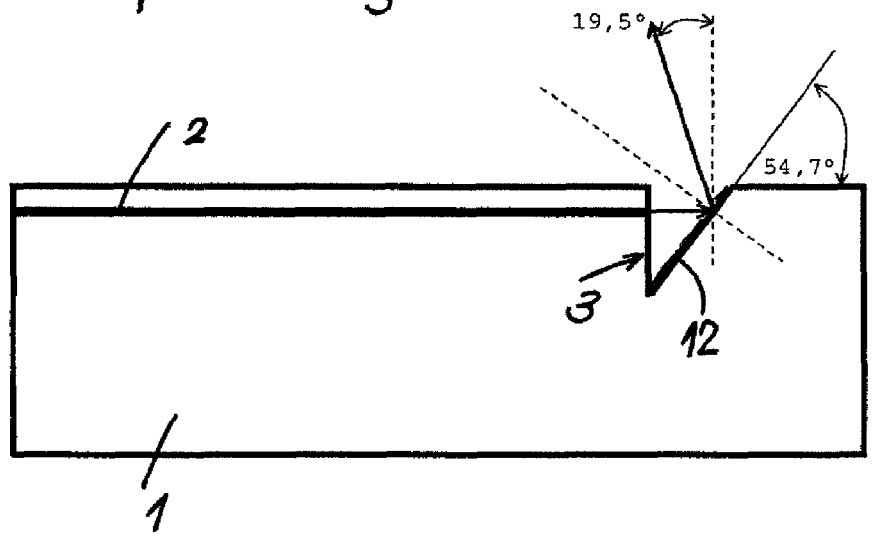
FIGS. 4 and 5 embodiments of the invention, wherein the same reference numbers as in FIGS. 1a-1d and FIGS. 2a-2b refer to similar elements.
Figure 5:
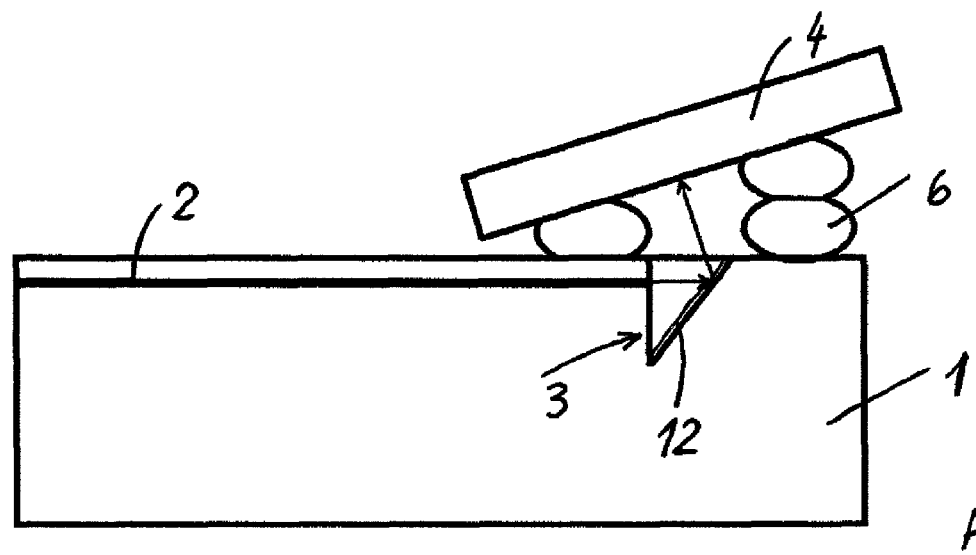

As the case may be, it is advantageous to use an oblique tool for receiving the optoelectronic component and for the connection or bonding, for the flip-chip assembly. Such a case is represented in FIG. 2. The tool 9, which has an oblique contact surface 10 for the optoelectronic component, is usually provided with holes, and here a hole or a bore 11 is shown, which is designed for applying a vacuum, i.e. the optoelectronic component is sucked onto the contact surface 10 (see FIG. 2a). The angle of the contact surface 10 to the horizontal hereby corresponds to the desired tilt angle of the component 4 with respect to the substrate surface 2. The connection elements 6 in the present case likewise have different heights, so that a suitably secure connection is ensured between the component 4 and the substrate. The tool 9 is pressed with the component 4 onto the connection elements, wherein with the provision of gold ball studs the connection can be realised by thermo-compression for example. Ultrasound is sometimes also additionally applied, for the reducing the bond temperature. After the optoelectronic component 4 has been connected to the substrate 1 via the connection elements 6, the tool 9 is bled and is lifted away from the optoelectronic component 4 (see FIG. 2b).

Of course other connection methods between the optoelectronic component, connection elements and substrate are also possible, for example the connection elements can be soldered or bonded to the component or the substrate, or deformed with this.

If the bumps are designed as solder bumps, different methods for producing different heights of connection elements can be applied. For example, equally high solder bumps can be soldered onto differently high pads. Moreover, different heights of the connection elements 6 can be achieved by way of different solder volumes. As already mentioned, a solder bump due to the surface energy assumes a previously predictable geometry on flip-chip soldering. Solders can be created on a land surface or pad with the same height but with a differently large diameter in a relatively simple manner. If a part of the solder is located on a non-wetting surface, then it de-wets there during the melting, which is to say melting-on, and achieves a greater height on the remaining wetting surface. An oblique arrangement of the component on the substrate arises if large bump diameters with dewetting part-surfaces lie on the one a side of the optoelectronic component or of the substrate, and smaller bump diameters on the other side.

Different heights of the solder bumps can also be achieved if the wetting surfaces are designed differently large given the same solder volume. By way of this, a lower bump height arises on larger wetting surfaces than on smaller surfaces. If with regard to the optoelectronic component large contact surfaces or land surfaces are arranged on the one side and smaller ones on the other side, then an obliqueness of the component results on melting.

EXAMPLE

For gold stud-bumps manufactured for example with 18 μm wire diameter, after bonding with 60 g per bump for single studs, a height of 19 μm was achieved, whereas a final height of 40 μm sets in for double studs which experienced the same force. The variation of the height lies below 1 μm. The exact parameters can be determined in advance and then adapted. On soldering, the height h which sets in can be computed from the volume of the solder V and the wetting surfaces on the substrate side and the chip side ($r_1$ and $r_2$). The height h which sets in can be determined from the volume computation of the ball layer $$V = \frac{\pi h}{6}(3r_1^2 + 3r_2^2 + h^2)$$

The research work which led to these results was financed by the European Union.

What is claimed is:

1. An arrangement of a substrate with at least one optical waveguide and with an optical coupling location for coupling in and/or coupling out an optical radiation into and/or out of the at least one optical waveguide, and of at least one optoelectronic component which is assembled onto the substrate,
    wherein the optical coupling location is arranged to couple in and/or couple out the radiation with a coupling-in and/or coupling-out angle of greater than 2° to the perpendicular to the substrate surface,
    wherein the optoelectronic component is assembled over the coupling location on the substrate in a manner tilted obliquely to the substrate surface, and
    wherein the tilt angle to this surface is identical to the coupling-in angle to permit a perpendicular exit of the optical radiation out of the at least one optoelectronic component and/or wherein the tilt angle to this surface is identical to the coupling-out angle to permit a perpendicular entry of the optical radiation into the at least one optoelectronic component.

2. The arrangement according to claim 1, wherein the optical coupling location of the substrate comprises an etched mirror or a grating etched into the substrate.

3. The arrangement according to claim 1, wherein the optoelectronic component includes at least one of a photodetector, a photonic integrated circuit, or a surface emitter (VCSEL).

4. The arrangement according to claim 1, wherein the optoelectronic component is connected to the substrate via connection elements, which include contact elements by way of flip-chip assembly, wherein the connection elements have different heights for setting the tilt angle.

5. The arrangement according to claim 1, wherein the optoelectronic component is electrically connected to the substrate via the connection elements provided as contact elements.

6. A method for manufacturing an arrangement of a substrate with at least one optical waveguide and with an optical coupling location for coupling in and/or coupling out an optical radiation into and/or out of the at least one optical waveguide, wherein the optical coupling location is designed to couple in and/or couple out the radiation with a coupling-in angle and/or coupling-out angle of greater than 2° to the perpendicular to the substrate surface, and of at least one optoelectronic component, with the following steps:
    depositing several connection elements onto the surface of the substrate and/or onto the optoelectronic component,
    arranging the optoelectronic component over the coupling location, and
    connecting the optoelectronic component to the substrate by way of connection elements, in a manner such that the optoelectronic component is arranged in a manner obliquely tilted to the substrate surface, with a tilt angle to this surface which is identical to the coupling-in angle to permit a perpendicular exit of the optical radiation out of the at least one optoelectronic component and/or which is identical to the coupling out angle to permit a perpendicular entry of the optical radiation into the at least one optoelectronic component.

7. The method according to claim 6, wherein the optoelectronic component is connected to the substrate by way of the flip-chip method,
wherein the connection elements include connection bodies and land surfaces for the connection bodies, and the land surfaces are deposited onto the substrate and/or onto the optical component, and
wherein the connection elements with respect to different sides of the optoelectronic component are deposited with different heights onto the substrate and/or the optoelectronic component, in a manner such that the tilt angle is achieved after the connection of the optoelectronic component to the substrate.

8. The method according to claim 7, wherein the connection bodies and/or the land surfaces are deposited at different heights with respect to the different sides of the optoelectronic component.

9. The method according to claim 7, wherein the connection bodies are deposited over one another in a different number with respect to the different sides of the optoelectronic component.

10. The method according to claim 7, wherein the land surfaces at least partly include electrically conductive contact surfaces.

11. The method according to claim 7, wherein the connection bodies are deposited as bumps onto the land surfaces.

12. The method according to claim 6, wherein the connection of the optoelectronic component and of the substrate via the connection elements includes at least one of thermocompression, ultrasound bonding, bonding, and/or soldering.

13. The method according to claim 6, wherein the connection bodies of solder material, with respect to the different sides of the optoelectronic component are deposited with different solder volumes onto land surfaces of the same size or with the same solder volumes onto land surfaces of a different size, and that on melting, different heights of the melted connection bodies are set on account of the minimisation of surface energy, in a manner such that the tilt angle between the optoelectronic component and the substrate is set.

14. The method according to claim 13,
wherein with regard to one side of the optoelectronic component, connection bodies of solder material are deposited on the land surface with a greater diameter than the connection bodies of the surface of another side, and
wherein a part of the land surface with the solder material of the larger diameter dewets on melting, whereas the land surface with the solder material of the smaller diameter does not act in a de-wetting manner, in a manner such that the melted connection bodies with the dewetting part-surface result in a larger volume and a greater height is formed than the connection bodies on the land surface with the smaller diameter.

15. The method according to claim 6, wherein a tool with an oblique bearing-contact surface for receiving the optoelectronic component is applied, and this tool places the optoelectronic component onto the substrate with the connection elements and fixes it by thermo-compression.

* * * * *